Nov. 13, 1962 M. D. TETREAULT 3,063,230
SPINDLE BRAKE
Filed April 12, 1960 2 Sheets-Sheet 1

INVENTOR.
MERRITT D. TETREAULT
BY Brumbaugh, Free, Graves & Donohue
his ATTORNEYS.

Nov. 13, 1962  M. D. TETREAULT  3,063,230
SPINDLE BRAKE
Filed April 12, 1960  2 Sheets-Sheet 2

INVENTOR.
MERRITT D. TETREAULT
BY Brumbaugh, Free, Graves & Donohue
his ATTORNEYS

United States Patent Office 3,063,230
Patented Nov. 13, 1962

3,063,230
SPINDLE BRAKE
Merritt D. Tetreault, East Douglas, Mass., assignor to Whitin Machine Works, Whitinsville, Mass., a corporation of Massachusetts
Filed Apr. 12, 1960, Ser. No. 21,742
7 Claims. (Cl. 57—88)

This invention relates to brake mechanisms for spindles which are used in spinning and other operations upon fibrous materials. Generally speaking, these mechanisms are illustrated in British Patent No. 10,277 of 1887. The particular structure of the spindle mechanism itself is of no importance insofar as the present invention is concerned but only the particular manner of providing, on these spindle mechanisms, an improved form of brake mechanism.

During operation of machines on which these spindle mechanisms are mounted, it frequently is desirable to arrest the rotation of a spindle in order to effect a change or other operation. Brake mechanisms have heretofore been provided to accomplish this purpose but, in existing forms of brake mechanism, the braking stresses have applied transverse stresses to the spindles, which stresses are imparted to the spindle bearings, and these stresses have been found to be objectionable.

In accordance with the present invention, it is proposed to provide a brake mechanism for spindles wherein the braking stresses applied to the spindle do not develop transverse stresses in the spindle-supporting mechanism and bearings.

The foregoing and other objects are accomplished by means of a brake mechanism wherein a plurality of brake shoes are provided and are so controlled that the braking forces upon opposite sides of a plane passing through and including the spindle axis are equalized.

In order that the invention may be more fully understood, reference will now be made to the accompanying drawings, wherein.

Figure 1:
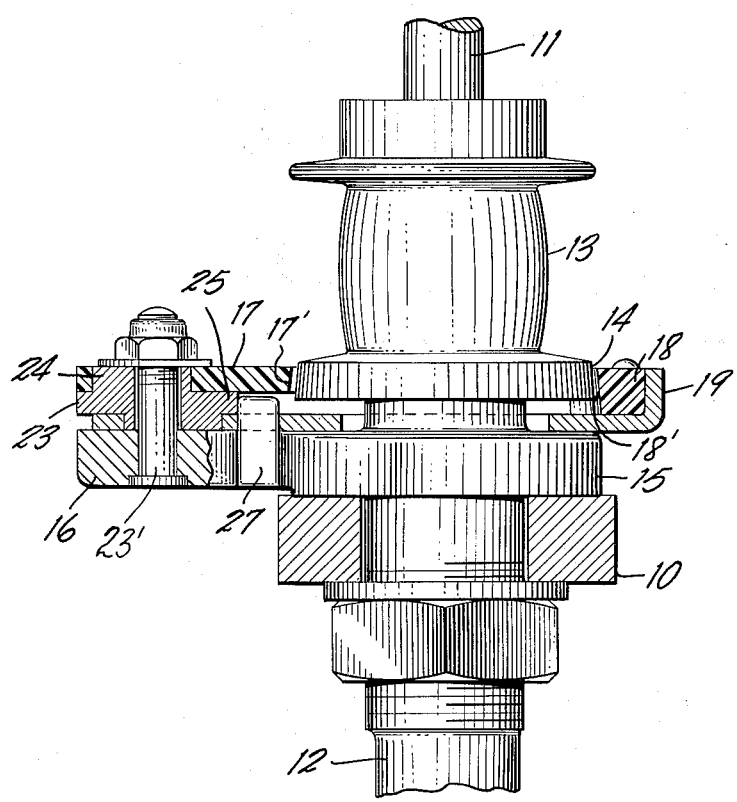
FIG. 1 is a view in elevation, partly broken away and in section, showing a portion of a spindle and a spindle brake mechanism constructed in accordance with the present invention.

Referring to FIG. 1, the spindle rail of a machine of conventional form is illustrated at 10. This rail is provided for mounting a multiplicity of spindles in accordance with standard practice. A spindle is illustrated at 11 and is provided with a bolster case 12 within which it is journaled. A whorl 13 is formed upon the spindle in accordance with standard practice and, in accordance with the present invention, is provided with a braking surface 14 adjacent to or integral with the lower flange of the whorl. It is preferred, in accordance with the present invention, that this braking surface 14 have a slight downward and outer taper, as illustrated in FIG. 1, in order that braking forces applied to the spindle may not tend to dislodge the spindle upwardly.

In order that a suitable brake mechanism may be provided, the bolster case is formed with a flange 15 having an arm 16 upon which braking members 17 and 18 are mounted. The braking member 18 is mounted upon a plate 19 (as shown particularly in FIG. 8), this plate being formed with a central aperture 20 that encircles or embraces the bolster case 12 with sufficient play to permit a desired movement of the plate 19 in order to accomplish the desired braking operations.

Figure 4:
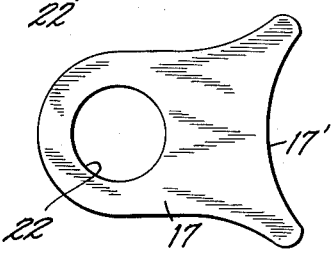
FIG. 4 is a plan view of the brake element shown in FIG. 3.
Figure 8:
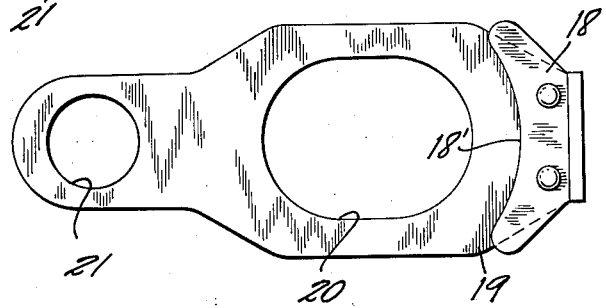
FIG. 8 is a plan view of the brake element shown in FIG. 7.

Referring further to FIG. 8, the plate 19 is formed with a cam recess 21 which is adapted to receive cam mechanism presently to be described. The lefthand braking member 17 (as viewed in FIG. 1) is also formed with an opening 22 (FIG. 4), which opening receives an operating cam now to be described.

Figure 2:
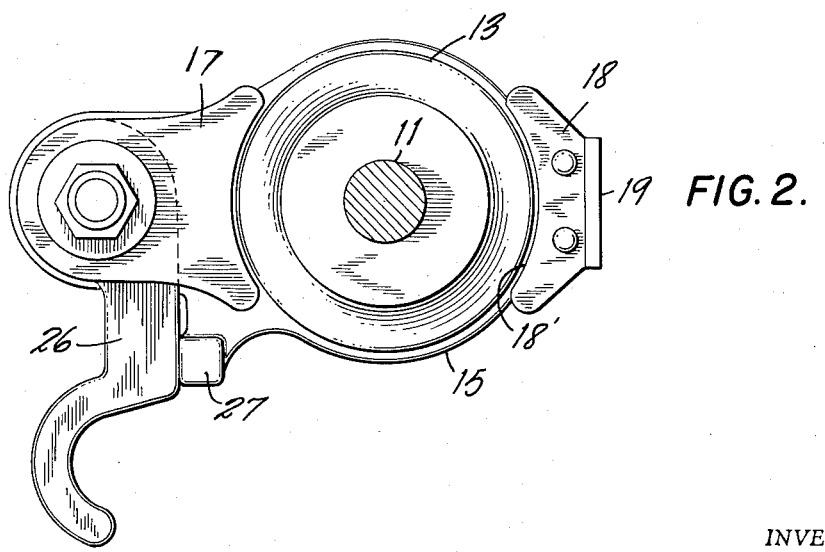
FIG. 2 is a plan view of the structure shown in FIG. 1.
Figure 3:
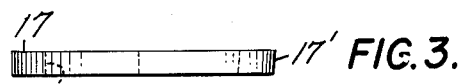
FIG. 3 is a view in side elevation of one of the braking elements illustrated in FIGS. 1 and 2.
Figure 5:
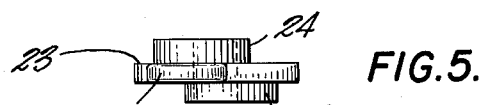
FIG. 5 is a detailed view showing the cam and operating mechanism for operating the brake elements shown in FIGS. 1 and 2.
Figure 6:
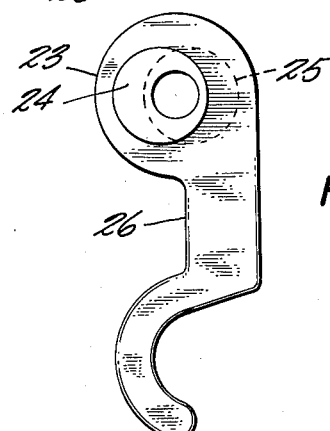
FIG. 6 is a plan view showing the cam mechanism of FIG. 5.
Figure 7:
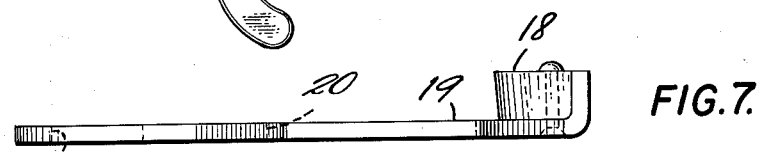
FIG. 7 is a view in elevation showing the righthand brake element and its mounting mechanism as viewed in FIG. 1.

Referring to FIGS. 1, 5 and 6, the mechanism will be seen to include an actuating or cam body indicated generally at 23 formed with an upper eccentric cam lobe 24 and a lower cam lobe 25, the body being rotatably mounted upon a stud 23'. The upper lobe 24 is received within the opening 22 of the brake shoe or member 17 while the lower lobe 25 is received within the opening 21 of the plate 19. The cam member 23 is provided with an operating arm 26 that is adapted to rest, in its normal inoperative position, against a stop member 27 that is formed on the flange 15 (see FIGS. 1 and 2). Any suitable spring mechanism may be provided, if desired, to urge the elements into the position illustrated in FIGS. 1 and 2.

It will be seen, from FIG. 1, that the braking surface 17' of the brake member 17 and the braking surface 18' of the brake member 18 are tapered to agree with the taper of the brake surface 14. Thus, when the arm 26 is moved away from the stop 27 (clockwise, as viewed in FIG. 2), the upper and lower cams simultaneously move the brake members 17 and 18 inwardly toward the axis of the spindle 11 and cause the engagement of the co-operating braking surfaces 17' and 18' with the conical brake surface 14. The forces exerted by these brake members upon opposite sides of the axis of the spindle are thus balanced and no objectionable stresses are imparted to the spindle.

While the invention has been described with reference to the specific structure shown in the accompanying drawings, it is not to be limited save as described in the appended claims.

I claim:
1. A mechanism for braking the rotation of a spindle and releasing it which comprises a member mounted on a support and extending transversely past said spindle and having at one end a first brake shoe that can be applied to one side of the spindle by endwise movement of said member, a second brake shoe disposed on the other side of the spindle diametrically opposite from said first shoe and engageable with said spindle, two eccentric cams coupled for rotation together at said other side of said spindle, means rotatably mounting said cams for rotation about a common axis, one cam being coupled to said first shoe and the other to said second brake shoe for concurrent movement of said shoes toward said spindle when said cams are rotated in one direction and apart when the said cams are rotated in the opposite directions, means by which said cams may be rotated in either direction whereby said first and second brake shoes may be positively operated selectively into contact with the spindle to stop its rotation and out of contact therewith to permit rotation of said spindle.

2. Spindle brake mechanism according to claim 1 wherein the braking surface comprises a flange having a braking surface sloping outwardly and downwardly to prevent the spindle from rising when braking forces are applied to the braking surface.

3. Spindle brake mechanism according to claim 1 wherein the plurality of shoes comprise two brake shoes disposed upon opposite sides of the axis of the spindle.

4. Spindle brake mechanism according to claim 1 wherein the means to move the shoes comprises two shoe-mounting plates slideably mounted on the supporting member, an actuating body on the supporting member, and cams on the body for engaging the plates to move them simultaneously in opposite directions.

5. Spindle brake mechanism comprising means for forming a braking surface on a rotatable spindle, a shoe-supporting member on a relatively fixed element for supporting the spindle, a plurality of brake shoes for engaging the braking surface, means to mount the shoes movably on the shoe-supporting member and on opposite sides of a plane passing through the axis of the spindle, and means to move the shoes simultaneously against the braking surface, the means to move the shoes comprising two shoe-mounting plates slideably mounted on the supporting member, apertures in the plates, an actuating body on the supporting member passing through the apertures in the plates, and cams on the body for engaging the sides of the apertures to move the plates simultaneously in opposite directions.

6. Spindle brake mechanism according to claim 5 wherein one of the plates is formed with an enlarged aperture through which the spindle extends and the plates are mounted in vertically superimposed positions.

7. Spindle brake mechanism according to claim 5 wherein one of the plates is formed with an enlarged aperture through which the spindle extends and the plates are mounted in vertically superimposed positions, and wherein the cams are formed to extend in opposite directions on opposite sides of the body.

References Cited in the file of this patent

UNITED STATES PATENTS

| | | |
|---|---|---|
| 2,333,047 | Schlums | Oct. 26, 1943 |
| 2,449,773 | Hargreaves et al. | Sept. 21, 1948 |
| 2,942,406 | Ellinger | June 28, 1960 |

FOREIGN PATENTS

| | | |
|---|---|---|
| 1,210,889 | France | Oct. 5, 1959 |